United States Patent
Mehta et al.

(10) Patent No.: US 11,915,215 B2
(45) Date of Patent: *Feb. 27, 2024

(54) SYSTEM AND APPARATUS FOR RESELLING DIGITAL MEDIA RIGHTS

(71) Applicant: OpenTV, Inc., San Francisco, CA (US)

(72) Inventors: Samir Mehta, Los Altos, CA (US); Laurent Piron, Aigle (CH); Gary Susumu Sano, Pleasanton, CA (US)

(73) Assignee: OPENTV, INC., San Francisco, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 17/303,156

(22) Filed: May 21, 2021

(65) Prior Publication Data

US 2021/0342801 A1 Nov. 4, 2021

Related U.S. Application Data

(63) Continuation of application No. 13/749,350, filed on Jan. 24, 2013, now Pat. No. 11,042,854.

(Continued)

(51) Int. Cl.
*G06Q 20/12* (2012.01)
*H04L 9/40* (2022.01)
(Continued)

(52) U.S. Cl.
CPC ......... *G06Q 20/1235* (2013.01); *G06F 21/10* (2013.01); *H04L 63/0823* (2013.01);
(Continued)

(58) Field of Classification Search
CPC . G06Q 20/1235; G06F 21/10; H04L 63/0823; H04L 63/10; H04N 21/25875;
(Continued)

(56) References Cited

U.S. PATENT DOCUMENTS 6,327,578 B1 12/2001 Linehan
7,487,128 B2 2/2009 Spagna et al.
(Continued)

FOREIGN PATENT DOCUMENTS

| CA | 2873061 | 2/2021 |
|---|---|---|
| WO | 2006029059 | 3/2006 |
| WO | 2013169742 | 11/2013 |

OTHER PUBLICATIONS

"International Application Serial No. PCT US2013 039905, International Search Report dated Sep. 13, 2013", 2 pgs.
(Continued)

*Primary Examiner* — John W Hayes
*Assistant Examiner* — Edgar R. Martinez-Hernandez
(74) *Attorney, Agent, or Firm* — SCHWEGMAN LUNDBERG & WOESSNER, P.A.

(57) ABSTRACT

In example embodiments, a system and method for managing the resale of digital media rights is provided. In example embodiments, user accounts that store digital media rights for digital content may be maintained. An indication that a first user having a first user account intends to transfer digital media rights for a particular digital content may is received. A verification process is performed to verify that the digital media rights of the first user are transferable. Based on an indication that a transaction has occurred, the digital media rights are transferred from the first user account to a second user account associated with a second user that is a recipient of the digital media rights.

18 Claims, 6 Drawing Sheets

Related U.S. Application Data

(60) Provisional application No. 61/643,674, filed on May 7, 2012.

(51) Int. Cl.

| | |
|---|---|
| *H04N 21/258* | (2011.01) |
| *H04N 21/254* | (2011.01) |
| *H04N 21/24* | (2011.01) |
| *H04N 21/442* | (2011.01) |
| *H04N 21/8355* | (2011.01) |
| *G06F 21/10* | (2013.01) |

(52) U.S. Cl.
CPC ......... *H04L 63/10* (2013.01); *H04N 21/2407* (2013.01); *H04N 21/2541* (2013.01); *H04N 21/25875* (2013.01); *H04N 21/44204* (2013.01); *H04N 21/8355* (2013.01)

(58) Field of Classification Search
CPC ........... H04N 21/2541; H04N 21/2407; H04N 21/44204; H04N 21/8355
See application file for complete search history.

(56) References Cited

U.S. PATENT DOCUMENTS

| | | | |
|---|---|---|---|
| 7,818,811 B2 | 10/2010 | Kirovski et al. | |
| 8,359,246 B2 | 1/2013 | Buchheit | |
| 8,751,788 B2 | 6/2014 | Leach | |
| 11,042,854 B2 | 6/2021 | Mehta et al. | |
| 2004/0199471 A1* | 10/2004 | Hardjono | G06F 21/10 705/50 |
| 2007/0038576 A1 | 2/2007 | Lee | |
| 2007/0078777 A1 | 4/2007 | Demartini et al. | |
| 2007/0079381 A1 | 4/2007 | Hartung et al. | |
| 2007/0189514 A1 | 8/2007 | Mehta et al. | |
| 2007/0198421 A1 | 8/2007 | Muller et al. | |
| 2007/0265932 A1* | 11/2007 | Im | G06F 21/10 705/26.1 |
| 2008/0006591 A1 | 1/2008 | Corrente | |
| 2008/0065911 A1 | 3/2008 | Elazar | |
| 2009/0106847 A1 | 4/2009 | Krupman et al. | |
| 2009/0228985 A1 | 9/2009 | Maurer | |
| 2010/0008500 A1 | 1/2010 | Lisanke et al. | |
| 2010/0082448 A1 | 4/2010 | Lin et al. | |
| 2011/0016182 A1 | 1/2011 | Harris et al. | |
| 2011/0022523 A1 | 1/2011 | Ruan | |
| 2011/0225236 A1* | 9/2011 | Kim | G06F 8/40 709/203 |
| 2011/0231273 A1 | 9/2011 | Buchheit | |
| 2011/0289601 A1 | 11/2011 | Bellwood et al. | |
| 2013/0060661 A1* | 3/2013 | Block | G06Q 30/06 726/28 |
| 2013/0174223 A1* | 7/2013 | Dykeman | G06F 21/10 726/4 |
| 2013/0211971 A1 | 8/2013 | Lin et al. | |
| 2013/0297385 A1 | 11/2013 | Mehta et al. | |
| 2014/0067577 A1 | 3/2014 | Tucker | |
| 2015/0006402 A1 | 1/2015 | Macarthur et al. | |

OTHER PUBLICATIONS

"International Application Serial No. PCT US2013 039905, Written Opinion dated Sep. 13, 2013", 10 pgs.
"International Application Serial No. PCT US2013 039905, International Preliminary Report on Patentability dated Nov. 20, 2014", 8 pgs.
"U.S. Appl. No. 13/749,350, Non Final Office Action dated Oct. 23, 2015", 17 pgs.
"European Application Serial No. 13787457.4, Extended European Search Report dated Dec. 14, 2015", 5 pgs.
"U.S. Appl. No. 13/749,350, Response filed Mar. 22, 2016 to Non Final Office Action dated Oct. 23, 2015", 16 pgs.
"U.S. Appl. No. 13/749,350, Final Office Action dated Jul. 15, 2016", 25 pgs.
"U.S. Appl. No. 13/749,350, Response filed Oct. 14, 2016 to Final Office Action dated Jul. 15, 2016", 19 pgs.
"U.S. Appl. No. 13/749,350, Non Final Office Action dated Feb. 9, 2017", 31 pgs.
"U.S. Appl. No. 13/749,350, Response filed May 9, 2017 to Non Final Office Action dated Feb. 9, 2017", 19 pgs.
"U.S. Appl. No. 13/749,350, Final Office Action dated Aug. 11, 2017", 35 pgs.
"U.S. Appl. No. 13/749,350, Examiner Interview Summary dated Nov. 30, 2017", 3 pgs.
"U.S. Appl. No. 13/749,350, Response filed Dec. 11, 2017 to Final Office Action dated Aug. 11, 2017", 15 pgs.
"European Application Serial No. 13787457.4, Summons to Attend Oral Proceedings mailed Dec. 22, 2017", 8 pgs.
"U.S. Appl. No. 13/749,350, Non Final Office Action dated Oct. 5, 2018", 38 pgs.
"Brazilian Application Serial No. BR1120140279772, Office Action dated Dec. 7, 2018", with English translation, 2 pages.
"U.S. Appl. No. 13/749,350, Response filed Jan. 3, 2019 to Non Final Office Action dated Oct. 5, 2018", 15 pgs.
"U.S. Appl. No. 13/749,350, Examiner Interview Summary dated Jan. 11, 2019", 3 pgs.
"Canadian Application Serial No. 2,873,061, Examiner's Rule 30(2) Requisition dated Feb. 12, 2019", 4 pgs.
"U.S. Appl. No. 13/749,350, Final Office Action dated May 2, 2019", 30 pgs.
"Canadian Application Serial No. 2,873,061, Response filed Aug. 9, 2019 to Examiner's Rule 30(2) Requisition dated Feb. 12, 2019", 45 pgs.
"U.S. Appl. No. 13/749,350, Response Filed Sep. 3, 2019 to Final Office Action dated May 2, 2019", 14 pgs.
"U.S. Appl. No. 13/749,350, Examiner Interview Summary dated Sep. 6, 2019", 3 pgs.
"Brazilian Application Serial No. BR1120140279772, Office Action dated Jan. 3, 2020", with English translation, 7 pages.
"Brazilian Application Serial No. BR1120140279772, Response filed Apr. 13, 2020 to Office Action dated Jan. 3, 2020", with English claims, 52 pages.
"U.S. Appl. No. 13/749,350, Non Final Office Action dated Jul. 10, 2020", 35 pgs.
"U.S. Appl. No. 13/749,350, Response filed Nov. 10, 2020 to Non Final Office Action dated Jul. 10, 2020", 17 pgs.
"U.S. Appl. No. 13/749,350, Notice of Allowance dated Feb. 24, 2021", 12 pgs.
"Brazilian Application Serial No. BR1120140279772, Office Action dated Oct. 31, 2021", with English translation, 12 pages.
"Brazilian Application Serial No. BR1120140279772, Response Filed Feb. 4, 2022 to Office Action dated Oct. 31, 2021", with English claims, 21 pages.
Dutta, Ratna, "Key Management in Multi-Distributor based DRM System with Mobile Clients using IBE", (2009).
El Aimani, Laila, "Reselling Digital Content", International Conference on Availability, Reliability and Security, (2010).
Jamkhedkar, Pramod A, "Middleware Services for DRM", (2007).
Qun, Gao, "Digital Contents Interoperability between Diverse DRM Systems", (2010).
U.S. Appl. No. 13/749,350 U.S. Pat. No. 11,042,854, filed Jan. 24, 2013, System and Apparatus for Reselling Digital Media Rights.
"Brazilian Application Serial No. BR1120140279772, Office Action dated Feb. 28, 2022", with English translation, 14 pages.

* cited by examiner

SYSTEM AND APPARATUS FOR RESELLING DIGITAL MEDIA RIGHTS

RELATED APPLICATION

The present application is a continuation of U.S. patent application Ser. No. 13/749,350, filed Jan. 24, 2013, which claims the priority of U.S. Provisional Patent Application Ser. No. 61/643,674, filed May 7, 2012 and entitled "System and Apparatus of Reselling Digital Media Rights," which are hereby incorporated by reference in their entireties.

FIELD

The present disclosure relates generally to digital content resale, and in a specific example embodiment, to reselling verifiable digital media rights.

BACKGROUND

Typically, a consumer purchases digital rights to a digital media content for use on single or multiple devices. The consumer's digital rights to the digital content may be limited based on terms and restrictions of a digital certificate or license associated with the digital content. The digital content may include, but is not limited to movies, music, television shows, games, and electronic-books.

Digital Rights Management (DRM) is a set of access control methods which control the use of digital content and the devices on which the digital content is played after the purchase of the digital content. DRM technologies may prevent the user from copying the digital content or converting it into other formats. Some common DRM techniques are to restrict licensing agreements, encryption, scrambling, and tag embedding. Therefore, depending on the DRM being applied, each consumer may have a variety of rights and restrictions for their digital content. These technologies and tools are originally designed to prevent the illegal copying of content.

A unique characteristic of digital media content is that the transfer or copying of digital content may violate copyright laws. Therefore, unlike physically transferable media such as a CD, DVD, or cassette, where a consumer may physically resell tangible content, once a consumer owns digital rights to a digital content the resale of the content for monetization becomes stagnant.

BRIEF DESCRIPTION OF DRAWINGS

The appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments. It will be evident, however, to those skilled in the art that embodiments may be practiced without these specific details. In general, well-known instruction instances, protocols, structures, and techniques have not been shown in detail.

In example embodiments, a system and method for managing the resale of digital media rights is provided. In example embodiments, user accounts that store digital media rights for digital content may be maintained. An indication that a first user having a first user account intends to transfer digital media rights for a particular digital content is received. A verification process is performed to verify that the digital media rights of the first user are transferable. Based on an indication that a transaction has occurred, the digital media rights are transferred from the first user account to a second user account associated with a second user that is a recipient of the digital media rights.

The transaction may be a sale of the digital media rights to the second user or a gift of the digital media rights to the second user. In embodiments where the transaction is a sale, the digital media rights for the digital content may be listed for sale on a resale platform upon verifying the digital media rights of the first user. The first user may be blocked from accessing the digital content once the digital content is listed for sale.

The seller may sell the digital media rights to the digital content non-anonymously or anonymously. When selling anonymously, a token indicating the digital media rights for the digital content may be generated. The token is transferrable to the second user upon the transaction occurring. The second user may provide the token to a rights coordinator system, which may associate the digital media rights in the token with the second user account.

Figure 1:
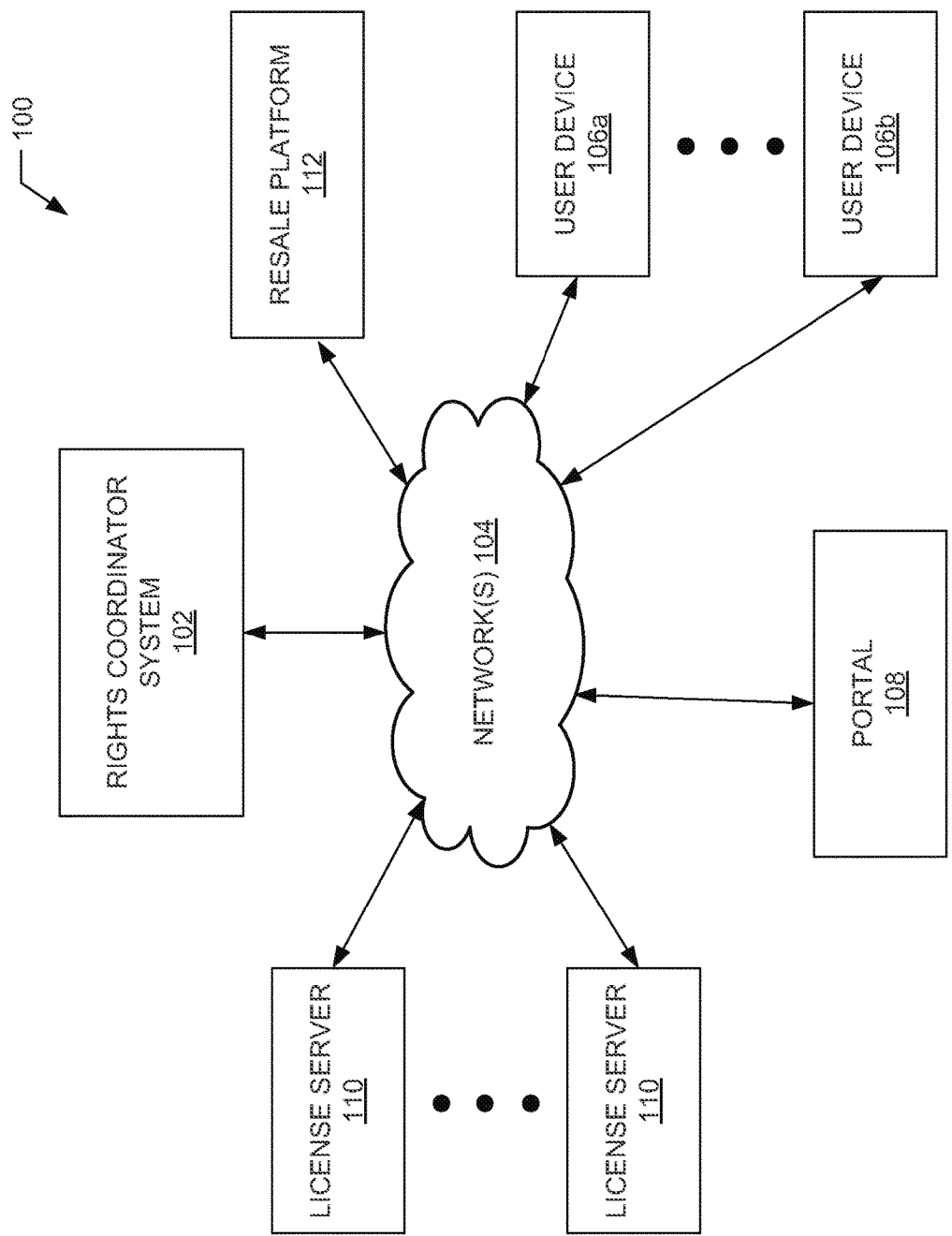
FIG. 1 is an example environment in which embodiments of the present invention may be practiced.

With reference to FIG. 1, a diagram illustrating an example environment 100 in which embodiments of a system for reselling digital media rights is shown. The environment 100 comprises a rights coordinator system 102 coupled via at least one network 104 (e.g., the Internet, wireless network, cellular network, or a Wide Area Network (WAN)) to a plurality of user devices 106 including user device 106*a* and user device 106*b*. Each user device 106 is associated with a user, and may enable the use of digital content by the user. The user device 106 may comprise a mobile phone, laptop, tablet, or any other device that a user may utilize to interact with digital content as well as to purchase or sell digital media rights.

The rights coordinator system 102 may comprise one or more servers that manage digital media rights and the transfer of these rights between users. In example embodiments, the rights coordinator system 102 may maintain accounts of the users at the user device 106 and stores digital media rights purchased by each user; thus operating as a digital locker. In one embodiment, the digital media rights may be received by the rights coordinator system 102 directly from a portal 108. The portal is a location or site where an initial digital content may be purchased by the user. As such, the portal may be an online shopping site (e.g., Amazon.com, iTunes). For example, when a user at the user device 106*a* purchases digital content from the portal 108, the portal sends a notification to the rights coordinator system 102 indicating that the user purchased the digital content. The notification may include a description of the digital content and the corresponding digital media rights. Ideally, an entity of the portal (e.g., a retail merchant) is a trusted entity and the notification (e.g., data exchange) between the portal 108, and the rights coordinator system 102 may be encrypted and authenticated. The notification causes an abstraction of the digital media rights to be associated with an account for the user.

In an alternative embodiment, the digital media rights may be received from the user via their user device 10a. In this embodiment, the user may request a token that may indicate ownership of the digital content, and as a result, ownership of the digital media rights in the digital content. The token may then be provided to the rights coordinator system 102 and the digital media rights associated with the account of the user at the rights coordinator system 102. Other means for associating the digital media rights at the rights coordination system 102 may be contemplated.

The digital media rights are abstractions of what the purchaser (e.g., user or consumer) is allowed to do with the purchased digital content. However, when the user wants to assert that right (e.g., play the digital content), a license may be accessed. In some embodiments, the portal 108 may generate the license for the user device 106a, which implements a specific digital rights management (DRM). Alternatively, the portal 108 may access a license server 110 to obtain the license.

A resale platform 112 comprises a mechanism for selling the digital media rights to the digital content under supervision of the rights coordinator system 102. For example, the resale platform 112 may be eBay. The resale platform 112 may work with the rights coordinator system 102 to verify digital media rights and to transfer the digital media rights to the buyer. The rights coordinator system 102 will be discussed in more detail in connection with FIG. 2 below.

The environment 100 of FIG. 1 is merely an example. A skilled artisan will recognize that the present disclosure is not limited to such an architecture or environment 100. For example, it will be appreciated that in alternative embodiments any number of user devices 106, portals 108, license servers 110, and resale platforms 112 may be coupled in communication. Additionally, any number of rights coordinator systems 102 may be provided such that each rights coordinator system 102 may be associated with a particular region or group of user devices.

Figure 2:
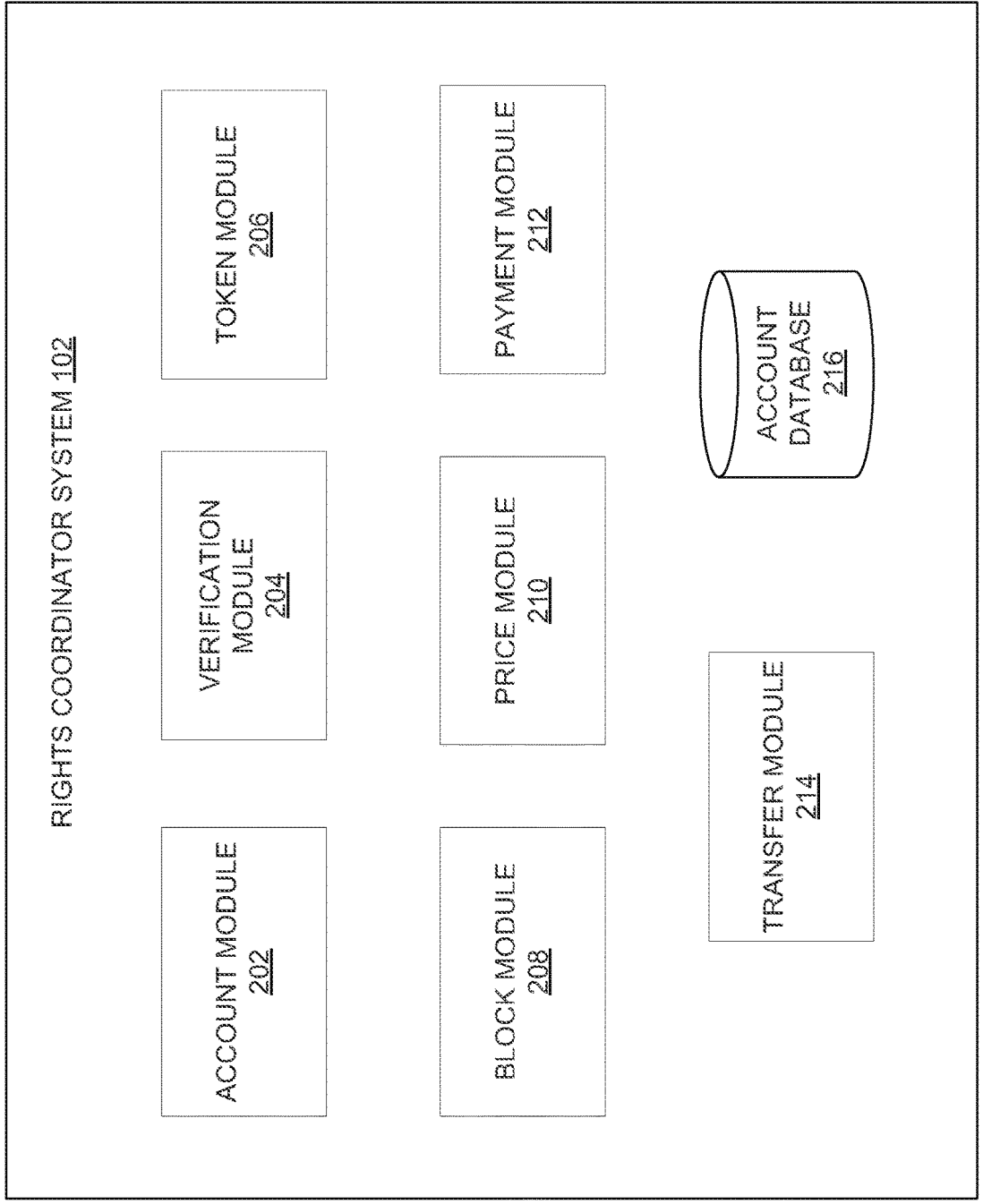
FIG. 2 is a detailed block diagram illustrating an example embodiment of a rights coordinator system.

FIG. 2 is a detailed block diagram illustrating an example embodiment of the rights coordinator system 102. The rights coordinator system 102 manages digital media rights in user accounts and the transfer of these rights between users. To enable these operations, the rights coordinator system 102 comprises an account module 202, a verification module 204, a token module 206, a block module 208, a price module 210, a payment module 212, a transfer module 214, and an account database 216 coupled in communication.

The account module 202 manages accounts of users that are interested in buying or selling digital media rights. Each user may store their digital media rights for their digital content in their account at the rights coordinator systems 102. The digital media rights information in the accounts may be stored to the account database 216.

The verification module 204 receives an indication of an offer to list digital media rights for sale and verifies authenticity of a digital certificate (e.g., indicating the digital media rights) of a digital content that a seller wants to sell (e.g., list with the resale platform 112). In order for the resale of the digital certificate to occur, the verification module 204 determines if the seller rightfully owns the digital certificate to be placed in the resale market (e.g., the resale platform 112). For instance, a seller may not resell content for which the seller only has a limited right to access (e.g., rental media). In this case, the verification module 204 may present an error message preventing the seller from uploading the digital certificate into the resale market. Thus the verification module 204 verifies the digital certificate's authenticity before allowing a seller to transfer (or offer to transfer) the digital media rights to another purchaser.

Furthermore, the verification module 204 determines parameters of the digital certificate and what the exact rights are that may be transferred in a sale or exchange. Different digital certificates confer different rights. For example, one digital certificate may allow for limitless copies on devices whereas another digital certificate may have more restricted uses. For instance, a seller may own a digital certificate that allows an owner to make ten copies on the owner's personal devices. If the seller has already made N number of copies, then the digital certificate only allows for the remaining number of copies. Thus, the seller is selling 10–N number of copies on the digital certificate. This may decrease the value of the digital media rights and as a result, affect pricing on the resale market for the digital certificate.

The token module 206 generates tokens for the digital media rights of the digital content that may be exchanged between the buyer and seller. In embodiments where the seller wants to remain anonymous, the seller may send a request to the token module 206 for a token for the digital media rights to the digital content. The token may be encrypted and signed, and may describe the digital media rights associated with the particular digital content without identifying the seller. The token module 206 generates the token to reflect the digital media rights that the seller has over the digital content they are offering to sell. As such, the token module 206 generates the token after the verification module 204 verifies and authenticates the ownership of the digital certificate.

The block module 208 blocks (or locks) the seller from accessing the digital content during a sale process. In some embodiments, the seller loses his ability to access and play the digital content as soon as the seller places the digital certificate up for resale on the resale platform 112. In other embodiments, the seller may still have access to the digital content until the seller completes transfer of the digital media rights to a buyer. As a result, when the seller attempts to play the digital content, the block module 208 may determine that the seller is not authorized to access the digital content.

In the anonymous sales method, once the token module 206 generates the token associated with the seller's rights, the block module 208 may remove the token's association with the seller (e.g., remove the digital media rights). When the seller does not have the digital media rights associated with his account, the seller may no longer access the digital content associated with the token.

When access is blocked, the digital media rights may be invalidated on all of the seller's devices. All the devices that are linked or associated with the seller's account for that particular digital content may be invalidated since the devices also need a license associated with the digital media rights. In one embodiment, each license has an expiration date, such that the digital content is only accessible for a limited period of time. In such a case, the digital content automatically becomes unusable after the period of time (e.g., the license expires). In another example embodiment, compliant devices may receive a request to delete licenses (e.g., from the block module 208).

The enforcement of this change of access at the device may require the assistance of a DRM system. Because the devices comply with compliance rules of the DRM system, the block module 208 may request the device to lock access to the digital content by either modifying the rights in the license associated with the digital content or by deleting the license. If the digital content is accessible on a group of devices or if several copies are available (e.g., protected by one or several DRM system), then each compliant device may perform this action. If a device is not able to perform this action when requested by the block module 208 (e.g., the device is switched off), then the device performs this action at the next synchronization. In this situation, content may still be accessible for a short period of time, but ultimately, all copies are made not accessible. In one example, synchronization with the rights coordinator system 102 may be made mandatory from time to time to ensure synchronization of the rights (e.g., adding and deleting rights). In some embodiments, adding rights for new digital content may be possible only if rights for the digital content are no longer available on the seller's device(s).

In some embodiments, the seller may offer to sell the digital media rights for a specified number of days. If the content is not sold during that period, then the seller regains access to the digital content until the sellers decides to place the digital media rights for sale again. Thus, the block module 208 may remove the block on the account for the seller when the specified period of time is reached.

The price module 210 may assist the seller in pricing their digital media rights for resale. In example embodiments, the price module 210 may provide a suggested price which the seller may decide to use. The suggested price may be determined, for example, based on availability of the digital media rights and the digital content. For digital content that is released in limited edition or is newly released, the resale value may be greater than digital content that is easily available and less popular. In another embodiment, quality or rights associated with the digital certificate may contribute to pricing of the digital content. For example, digital certificates which allow access to a limited number of devices may have a lower value than digital certificates which allow for unlimited number of copies. In yet another embodiment, the content provider may have a suggested list value for each digital certificate. Each of these factors may be taken into account for the pricing of the digital media rights. In some embodiments, the price module 210 may automatically or dynamically generate pricing for each digital media rights for digital content based on one or more of these embodiments.

The payment module 212 manages payment transactions including compensation to required parties. In some embodiments, the payment module 212 may report and provide compensation to the content provider (e.g., producer or studio) as well as a web service provider (e.g., operator of the resale platform 112) and the seller. Thus, the payment module 212 may allow the web service provider as well as content provider to continue to gain sales revenue for the resell of digital certificates. Every time a digital certificate is resold, a portion of that sale may go back to the content provider or the web service provider. This provides incentive for the content provider to be engaged in the digital resale process. In example embodiments, the payment module 212 determines an allocation of compensation for the required parties. In one embodiment, the percentages may be set by the content provider and be based on a listed value for each digital certificate.

In alternative embodiments, the resale platform 112 may manage the payment transaction. In some cases, a report of the payment transaction may be provided to the payment module 212. In other cases, the compensation for the content provider may be received from the resale platform 112 and transferred to the content provider via the payment module 212.

The transfer module 214 manages the transfer of the digital media rights from the seller to the buyer. When the transfer module 214 receives confirmation that the digital certificate has been purchased by a buyer, the digital media rights of the digital certificate are transferred. In some embodiments, the digital media rights maintained in the accounts of the account database 216 are updated to reflect the transfer. The non-anonymous and anonymous methods for transferring digital rights will be discussed in more detail in connection with FIG. 4 and FIG. 5, respectively, below.

In other embodiments, the transfer module 214 transfers the digital media rights from the license server 110 to the buyer. In some cases, the buyer may need to register with the license server 110 before being allowed to play the digital content on his devices. Thus when there is an exchange of ownership, the license server 110 may be notified of that change. In these cases, in order for the digital certificate transfer to be verified, the buyer's device is connected to the license server 110.

The transfer module 214 may also integrate parental control management such that devices that are designated for children are not allowed to purchase content that is outside of their approved bracket. Additionally, the transfer module 214 may, in some embodiments, check to ensure that there is only one license per household so that multiple persons in the same household do not purchase the same content on different devices if one license would be sufficient. As such, the device may receive an indication from the transfer module 214 whether it is allowed to play a certain digital content based on a profile of the user of the device.

While embodiments have been discussed above with respect to selling the digital media rights, digital media rights may also be exchanged. Even exchanges may occur when a price of two digital contents (and their digital media rights) is the same. DRM technologies that prevent copying are still in effect because users still cannot make unauthorized copies of the content. The seller either sells or reassigns the digital media rights to use the content based on the purchase or exchange of the digital certificate.

In a further embodiment, the transfer module 214 manages the digital media rights of the buyer through a web service platform (e.g., the resale platform 112). This online resale platform 112 may act as a transaction management system. In some cases, a user of the resale platform 112 may place a bid on the sale of pre-authenticated digital content for sale by the seller. The winner of the auction then gains the digital media rights to the digital certificate. The seller may then press a "transfer" button which may transfer his digital media rights to the digital content to the buyer or winner of the auction. Additionally, if the seller decides to keep his digital media rights rather than sell it, the seller may "delete" the posting for the digital media rights on the resale platform 112. This deletion may return the digital media rights back to seller rather than transferring them to a potential buyer. In embodiments where the seller was blocked from accessing the digital content media, the deletion of the posting will restore access to the digital media content to the seller.

While the account database 216 is shown as a part of the rights coordinator system 102, alternative embodiments may locate the account database 216 outside but coupled to the rights coordinator system 102. Additionally, more than one account database 216 may be utilized.

Figure 3:
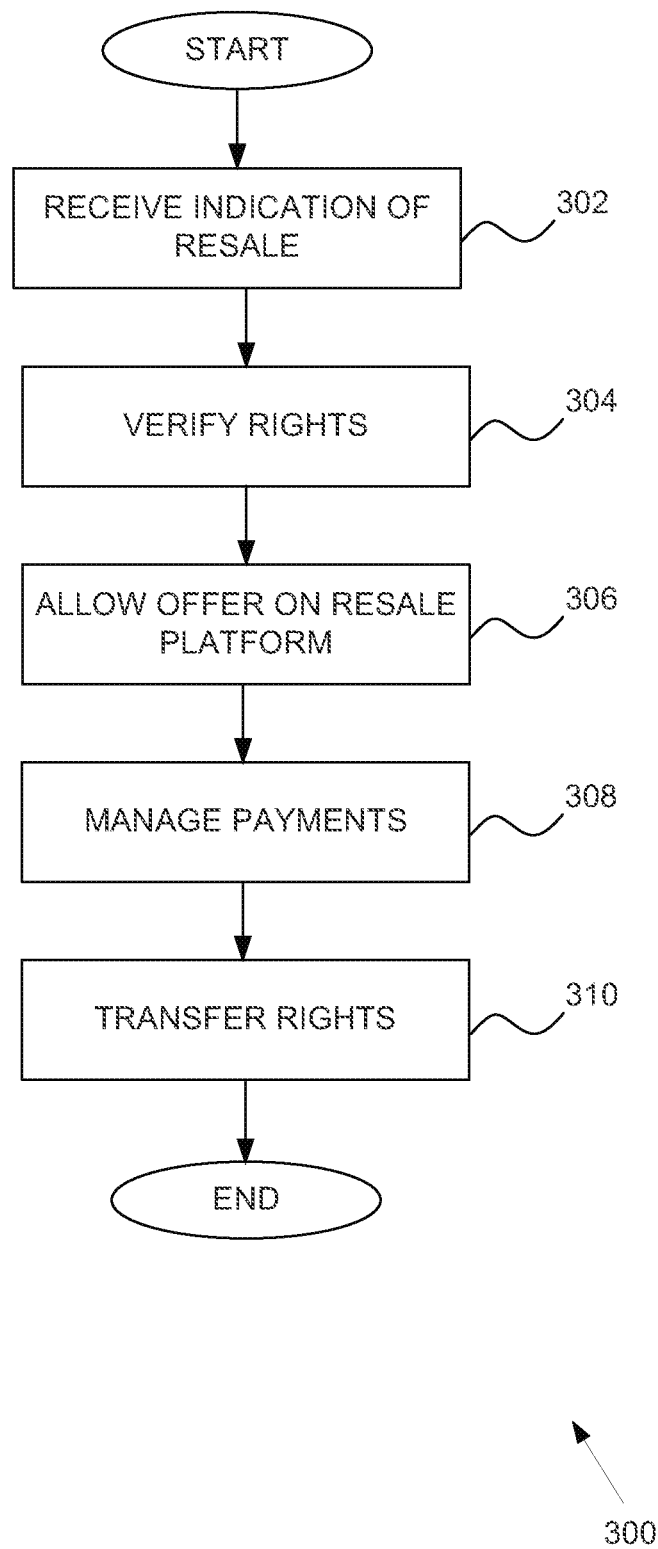
FIG. 3 is a flow diagram of an example method for reselling digital rights to digital media content.

FIG. 3 is a flow diagram of an example method 300 for reselling digital media rights to digital media content. The operations of the method 300 may be performed by the rights coordinator system 102 in communication with the other components of the environment 100. In operation 302, an indication for resale is received by, for example, the verification module 204. In some cases, the potential seller provides the indication directly to the verification module 204 by requesting the rights coordinator system 102 to list the digital media rights for sale with the resale platform 112. In other cases, the potential seller may attempt to list the digital media rights for sale with the resale platform 112, and the resale platform 112 sends the indication to the rights coordinator system 102 with a request to verify the digital media rights.

In operation 304, the digital media rights being offered for resale are verified. In example embodiments, the verification module 204 determines if the seller rightfully owns the digital certificate to be placed on the resale platform 112. If the seller is not the rightful owner of the digital media rights, the verification module 204 may present an error message preventing the seller from uploading the digital certificate into the resale market. In some embodiments, the verification module 204 may report (e.g., to the content provider) that the digital media content is illegally possessed by the seller. Furthermore, the verification module 204 determines parameters of the digital certificate and what the exact rights are that may be transferred in a sale.

Once the rights are verified, the digital media rights are allowed to be offered on the resale platform 112 in operation 306. In embodiments where the verification received the resale indication directly, the verification module 204 may forward verification information along with the digital content information of the offer to the resale platform 112 for listing on the resale platform 112. In embodiments where the seller attempts to list directly with the resale platform 112, the verification module 204 forwards verification confirmation to the resale platform 112, and the resale platform 112 proceeds with listing the offer.

Upon the seller forming an agreement to sell the digital media rights with a potential buyer, the payment is managed by the payment module 212 in operation 308. In example embodiments, the payment module 212 determines a share of compensation for entities that may be a party to the transaction. For instance, the content provider (producer) may receive a royalty or percentage of the resale amount. Additionally, an operator of the resale platform 112 may receiver a percentage of the resale amount. The seller may then receive a remaining amount after compensation is provided to the other entities. It is noted that not all cases may require compensation be provided to the content provider or the resale platform 112.

Upon payment, the digital media rights are transferred in operation 310. In example embodiments, the transfer module 214 may transfer the digital media rights from the seller to the buyer. In some embodiments, the digital media rights are deleted from the seller's account upon transfer. Details of the transfer process may be discussed in more detail in connection with FIG. 4 and FIG. 5. It is noted that operations 308 and 310 may be performed simultaneously in some embodiments.

Figure 4:
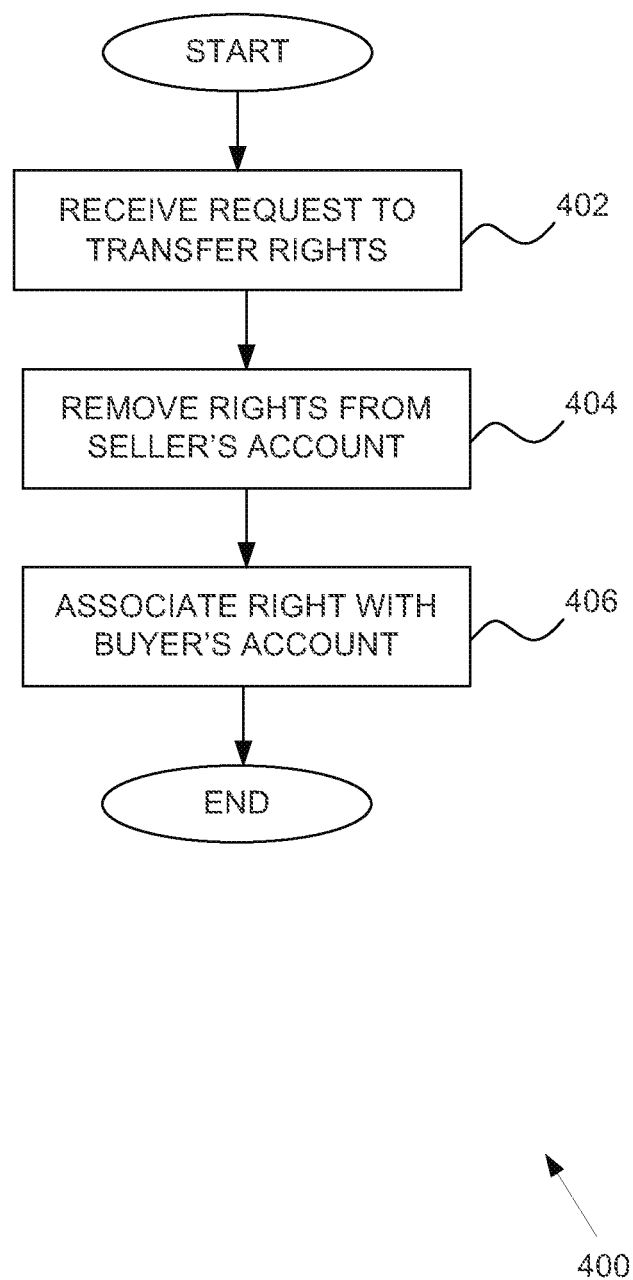
FIG. 4 is a flow diagram of an example method for non-anonymously transferring digital rights.

FIG. 4 is a flow diagram of an example method 400 for non-anonymously transferring digital media rights. In the non-anonymous method 400, the parties to the transaction are identifiable to each other (e.g., network handle known or actual identities known). In these embodiments, the seller may directly transfer his digital media rights to the buyer.

In operation 402, a request to transfer the digital media rights is received. In some embodiments, the request may be associated with the payment transaction (e.g., operation 308). For example, the request may include identifiers for the buyer and seller (or identifiers for the accounts of the buyer and sellers at the rights coordinator system 102) and payment information. Alternatively, the resale platform 112 may manage the payment transaction, and the transfer module 214 simply receives the transfer request.

In operation 404, the digital media rights may be removed from the seller's account at the rights coordinator system 102. For example, an entry in the account database 216 may be updated to remove the digital media rights from the seller's account. The digital media rights are then associated with the buyer's account in operation 406. Similarly, an entry in the account database 216 may be updated to associate the digital media rights with the buyer's account at the rights coordinator system 102. Once the digital media rights are associated with the buyer's account, the buyer may access the digital content according to the digital media rights. Additionally, the buyer may also sell his newly acquired digital media rights in a further transaction.

Figure 5:
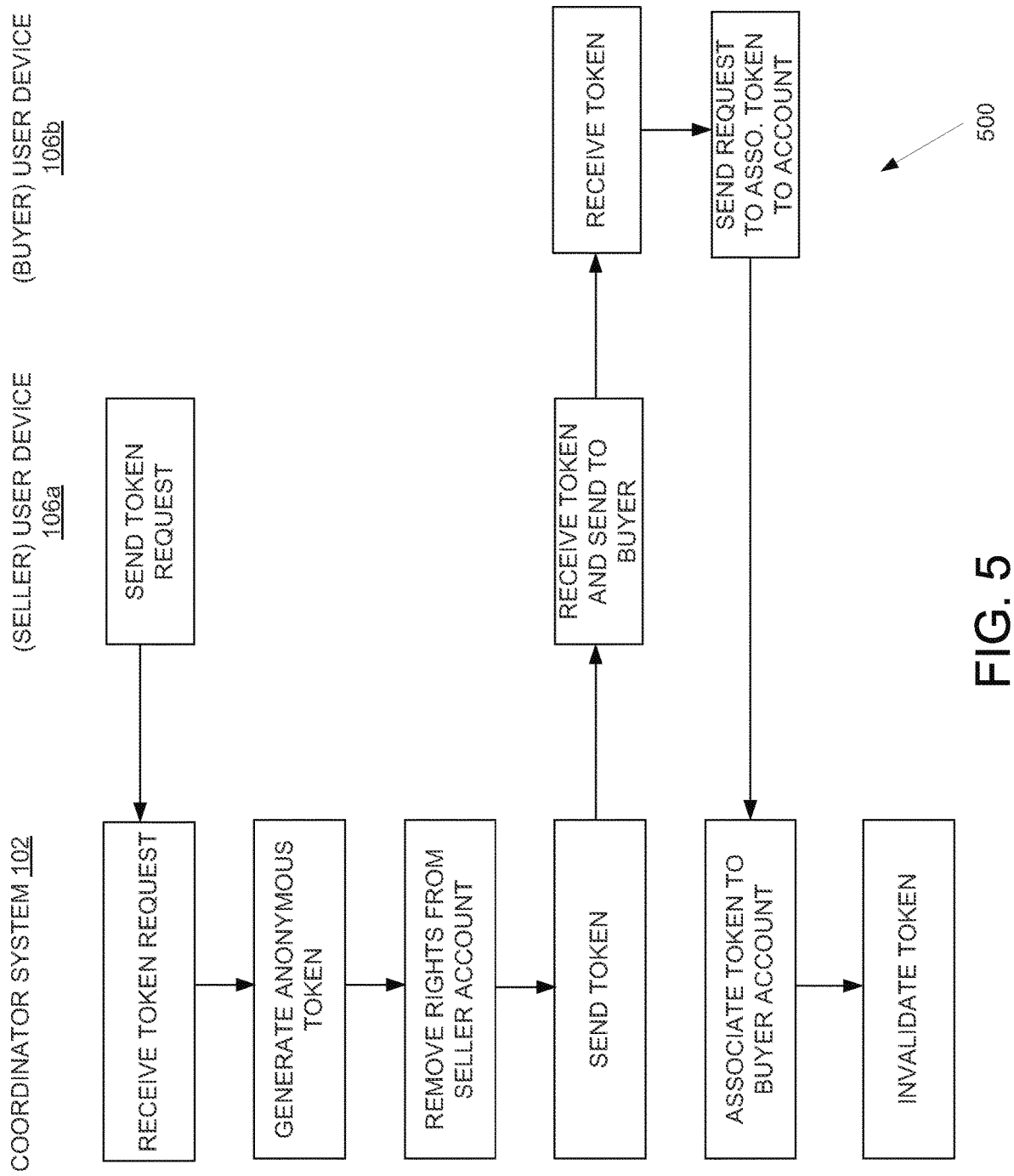
FIG. 5 is a flow diagram of an example method for anonymously transferring digital rights.

FIG. 5 is a flow diagram of an example method 500 for anonymously transferring digital media rights between a seller (e.g., at user device 106a) and a buyer (e.g., at user device 106b). Initially, the seller at the user device 106a sends a token request to the rights coordinator system 102. The rights coordinator system 102 receives the token request and the token module 206 generates the token for the digital media rights to the digital content by extracting the digital media rights from the seller's account. The token is a file containing information about the digital content and the digital media rights. The token may be encrypted and signed, and may describe the digital media rights associated with the particular digital content without identifying the seller.

In some embodiments, once the token module 206 generates the token, the block module 208 may block the digital media rights to the digital content from the seller's account. This may prevent the seller from accessing and using the digital content. In other cases, the digital media rights are not blocked until the digital media rights are transferred to the buyer.

Once the buyer purchases the digital media rights from the seller, the seller may transfer the token to the buyer (e.g. at the user device 106b). It is noted that the seller may also gift the digital content by giving the token to anyone they choose. The token may be transferred in various manners including, but not limited to, e-mails and USB device transfers. In alternative embodiments, the token may be generated and sent to the resale platform 112 and forwarded to the buyer by the resale platform 112.

In example embodiments, the token cannot be tracked (e.g., do not know from whose account the digital media rights are coming from). As such, in another alternative embodiment, the token module 206 may generate the token and send it directly to the buyer.

The buyer may then send a request to associate the token with the buyer's account. The request may include the token to the digital media rights. The rights coordinator system 102 (e.g the transfer module 214) matches the token from the buyer, associates the digita0 media 1 rights with the buyer's account, and invalidates the token at the rights coordinator system 102. The token is invalided in the rights coordinator system 102 because once the token is associated with the buyer's account, the buyer has the digitals media rights to the digital content and the token is no longer needed.

Figure 6:
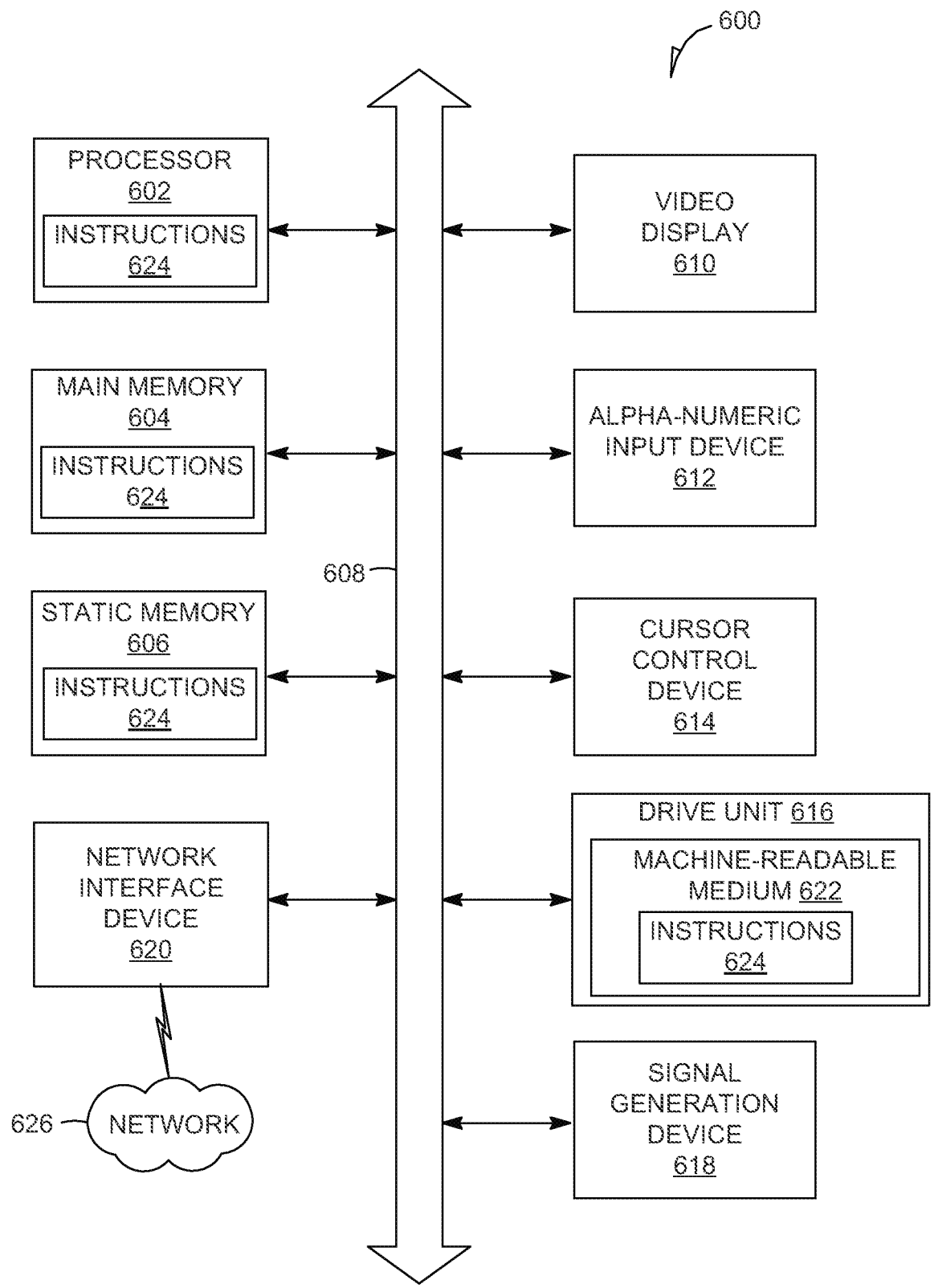
FIG. 6 is a simplified block diagram of a machine in an example form of a computing system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alpha-numeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, by a processor of a rights coordinator computing system via a network from a first user device of a first user, an indication to transfer a digital media right of the first user for a digital content;
   responsive to the receiving of the indication, verifying, by a verification module of the rights coordinator computing system, authenticity of a digital certificate for the digital content;
   in response to verifying the authenticity of the digital certificate, generating, by the rights coordinator computing system, a file describing the digital media right to the digital content owned by the first user;
   responsive to the generating of the file, disabling, by a block module of the digital rights coordinator computing system, authorization of the first user to the digital content, the disabling comprising sending, to the first user device, a request to remove a license to the digital media right for the digital content at the first user device; and
   based on an agreement to transfer the digital media right, transferring, by a transfer module of the rights coordinator computing system, the digital media right of the digital content from the first user to a second user.

2. The method of claim 1, wherein the verifying comprises:
   determining that the first user owns the digital certificate; and
   identifying a scope of the digital media right that is transferable, the file describing the digital media right comprising the scope of the digital media right.

3. The method of claim 2, wherein identifying the scope of the digital media right comprises:
   determining a number of copies allowed by a license;
   identifying a number of copies already made by the first user; and
   reducing the number of copies allowed by the license by the number of copies already made.

4. The method of claim 1, further comprising maintaining, in a database associated with the rights coordinator computing system, a user account storing information associated with digital media rights for a plurality of digital content of the first user, the database operating as a digital locker for digital media rights of the first user.

5. The method of claim 1, wherein the digital certificate comprises a token.

6. The method of claim 1, further comprising causing the digital media right to be listed for sale on a resale platform in response to the verifying of the authenticity of the digital certificate.

7. The method of claim 1, further comprising unblocking access to the digital content for the first user based on the digital media right not transferring after a specified time period.

8. The method of claim 1, wherein the file is used for anonymously transferring the digital media right, the file describing the digital media right associated with the digital content without identifying the first user.

9. The method of claim 1, wherein the transferring further comprises:
   receiving a request from the second user to associate the file with an account of the second user, the request from the second user including the file for the digital media right to the digital content; and
   associating the digital media right in the file with the account of the second user.

10. A system comprising:
    one or more processors; and
    a memory storing instructions which, when executed by the one or more processors, cause the system to perform operations comprising:
    receiving, by a rights coordinator computing system via a network from a first user device of a first user, an indication to transfer a digital media right of the first user for a digital content;
    responsive to the receiving of the indication, verifying, by the rights coordinator computing system, authenticity of a digital certificate for the digital content;
    in response to verifying the authenticity of the digital certificate, generating, by the rights coordinator computing system, a file describing the digital media right to the digital content owned by the first user;
    responsive to the generating of the file, disabling, by the digital rights coordinator computing system, authorization of the first user to the digital content, the disabling comprising sending, to the first user device, a request to remove a license to the digital media right for the digital content at the first user device; and
    based on an agreement to transfer the digital media right, transferring, by the rights coordinator computing system, the digital media right of the digital content from the first user to a second user.

11. The system of claim 10, wherein the verifying comprises:
    determining that the first user owns the digital certificate; and
    identifying a scope of the digital media right that is transferable, the file describing the digital media right comprising the scope of the digital media right.

12. The system of claim 11, wherein identifying the scope of the digital media right comprises:
    determining a number of copies allowed by a license;
    identifying a number of copies already made by the first user; and
    reducing the number of copies allowed by the license by the number of copies already made.

13. The system of claim 10, wherein the operations further comprise maintaining, in a database associated with the rights coordinator computing system, a user account storing information associated with digital media rights for a plurality of digital content of the first user, the database operating as a digital locker for digital media rights of the first user.

14. The system of claim 10, wherein the digital certificate comprises a token.

15. The system of claim 10, wherein the operations further comprise causing the digital media right to be listed for sale on a resale platform in response to the verifying of the authenticity of the digital certificate.

16. The system of claim 10, wherein the operations further comprise unblocking access to the digital content for the first user based on the digital media right not transferring after a specified time period.

17. The system of claim 1, wherein the file is used for anonymously transferring the digital media right, the file describing the digital media right associated with the digital content without identifying the first user.

18. A non-transitory machine-storage medium storing instructions that, when executed by one or more processors of a machine, causes the machine to perform operations comprising:

receiving, by a rights coordinator computing system via a network from a first user device of a first user, an indication to transfer a digital media right of the first user for a digital content;

responsive to the receiving of the indication, verifying, by the rights coordinator computing system, authenticity of a digital certificate for the digital content;

in response to verifying the authenticity of the digital certificate, generating, by the rights coordinator computing system, a file describing the digital media right to the digital content owned by the first user;

responsive to the generating of the file, disabling, by the digital rights coordinator computing system, authorization of the first user to the digital content, the disabling comprising sending, to the first user device, a request to remove a license to the digital media right for the digital content at the first user device; and based on an agreement to transfer the digital media right, transferring, by the rights coordinator computing system, the digital media right of the digital content from the first user to a second user.

* * * * *